United States Patent Office 3,481,073
Patented Dec. 2, 1969

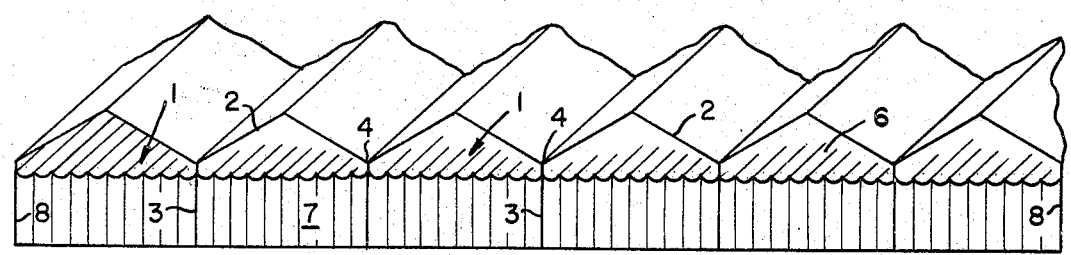
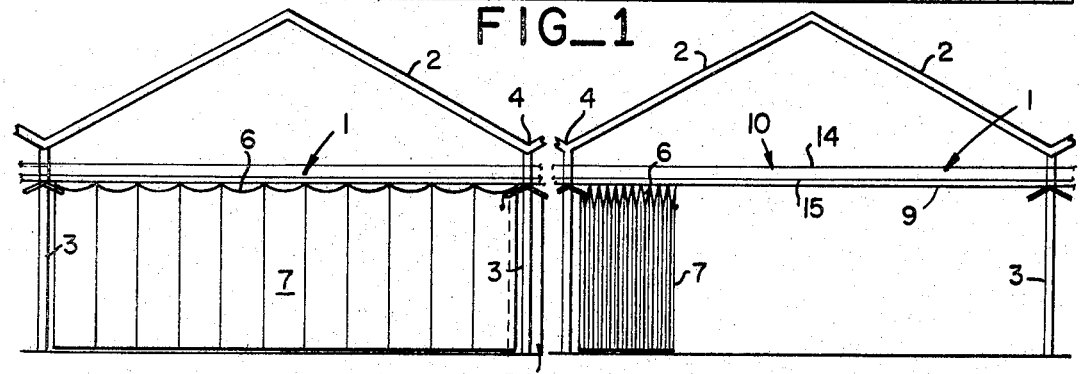
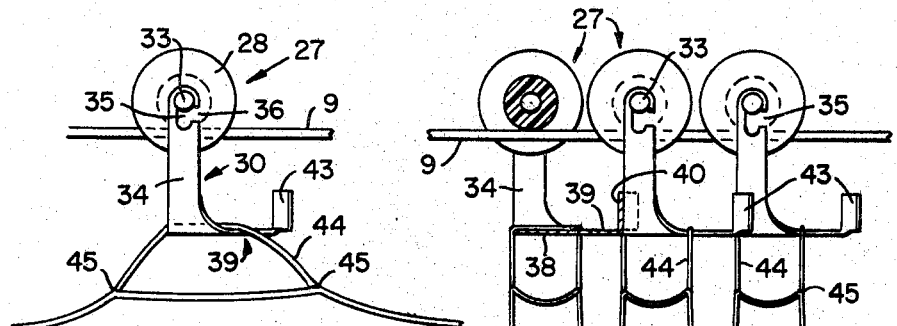
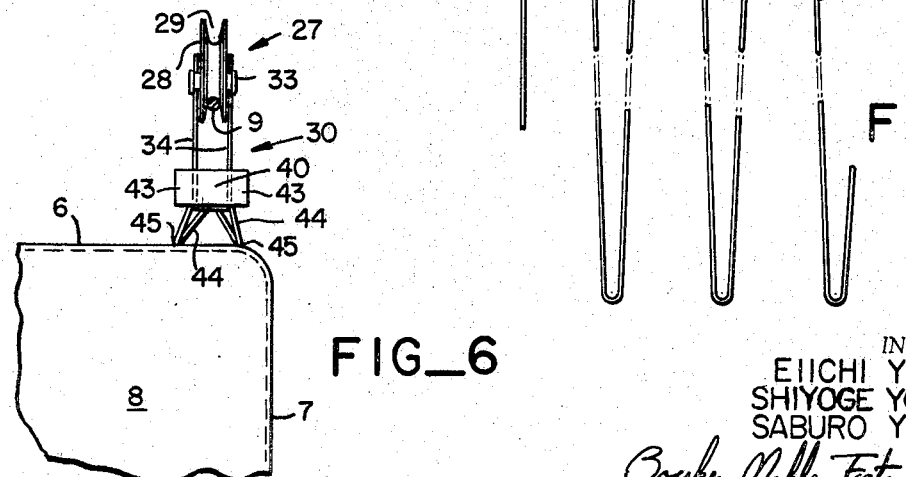

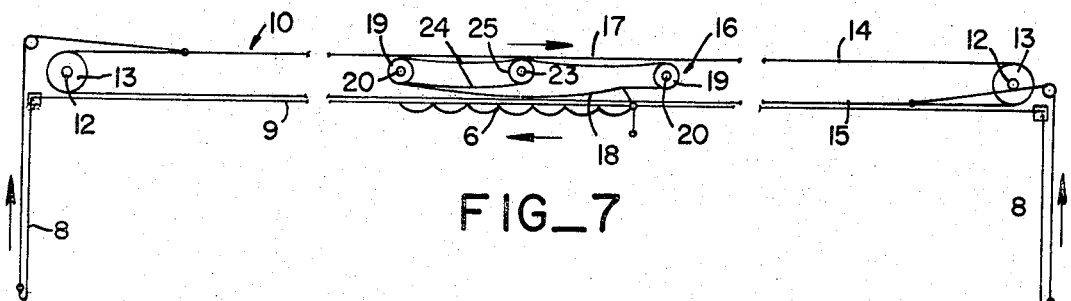
FIG_7
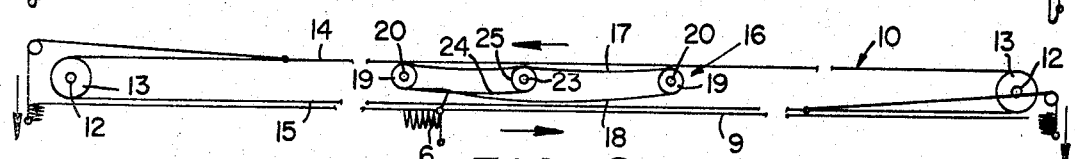
FIG_8
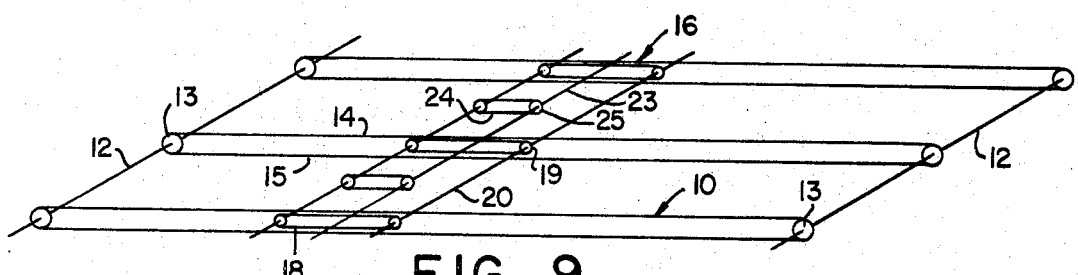
FIG_9
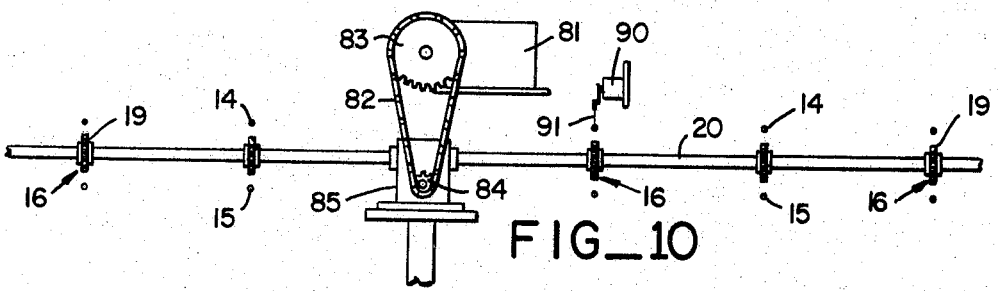
FIG_10
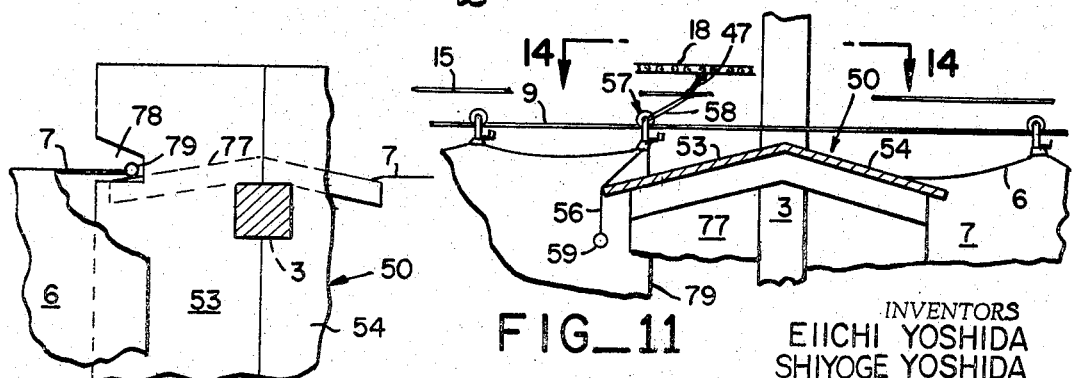
FIG_14     FIG_11
INVENTORS
EIICHI YOSHIDA
SHIYOGE YOSHIDA
SABURO YOSHIDA
ATTORNEYS

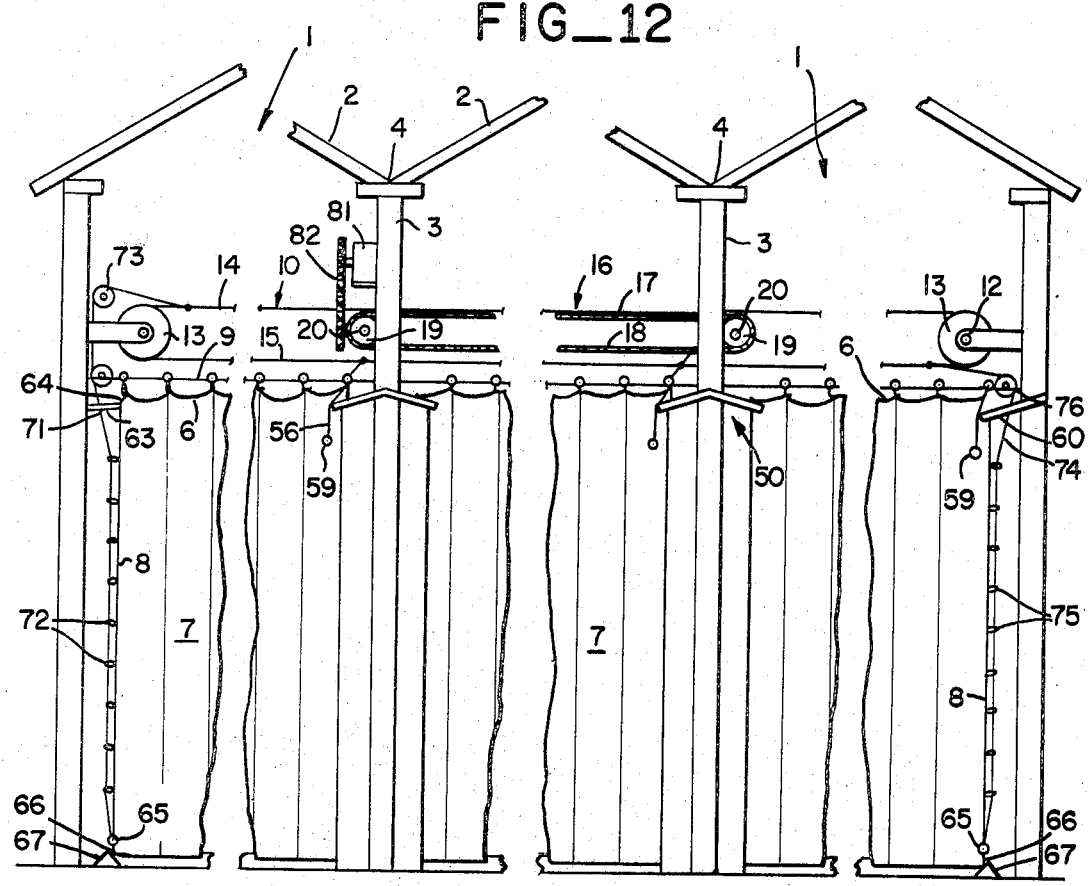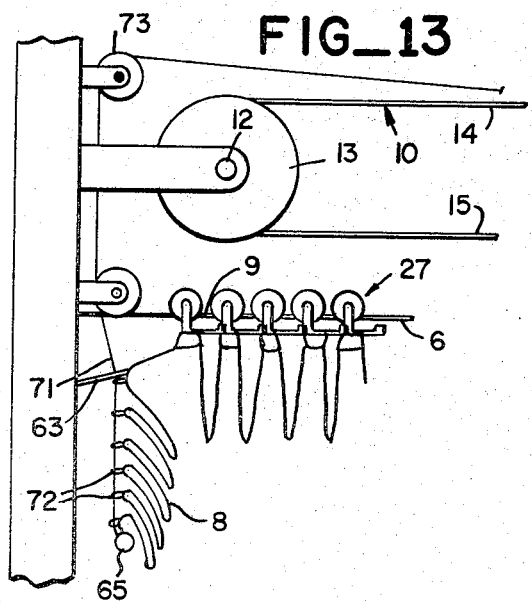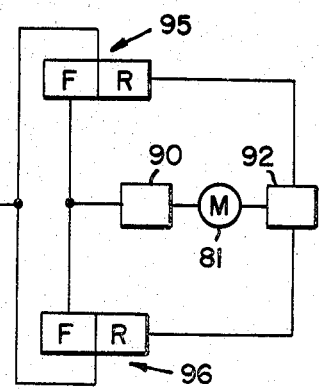

3,481,073
DAYLIGHT CONTROL MEANS IN
GREENHOUSES
Eiichi Yoshida, Saburo Yoshida, and Shiyoge Yoshida, Hayward, Calif., assignors to Sunnyside Nurseries Inc., Hayward, Calif., a corporation of California
Filed June 20, 1967, Ser. No. 647,380
Int. Cl. A01g 9/14
U.S. Cl. 47—17   7 Claims

ABSTRACT OF THE DISCLOSURE

This invention relates to a greenhouse installation and has for one of its objects the provision of improved means for controlling the admission and exclusion of daylight to a greenhouse that has a multiple of communicating bays, each of which is the area or space below a gable-roof, with said roofs adjacent to each other to provide parallel valleys between them.

---

Apparatus for enclosing and darkening a growing area within a greenhouse with openable opaque curtains.

It is customary in greenhouse structure to construct them with a plurality of transparent gable tops and adjacent parallel valleys between such tops. The area below each gable top may be called a "bay" and there may be five, ten, twenty, or more such bays in side-by-side relation with no partitions between, the building having two opposite end walls at the ends of the gable tops and two opposite sidewalls at the ends of the row of adjoining bays.

The systematic control of the admission and extension of daylight to within a greenhouse has a material bearing upon the rate of growth of blossoming plants to maturity and also the size and profusion of the blossoms.

One of the objects of this invention is the provision of improved means for controlling the admission and exclusion of daylight to the area enclosed by the end and sidewalls of a greenhouse of the above-described type.

Inasmuch as there may be a relatively large number of communicating bays below the multiple gable-top of a building of the type described above, a very important feature of this invention is the provision of relatively economical means for simultaneously admitting and excluding daylight to all of the bays under such top.

The present invention contemplates the employment of top, side, and end curtains adapted to enclose the plant-growing space in the bays that are enclosed by the side and end walls of the greenhouse, and which curtains include separate top sections for the respective bays that extend longitudinally of the bays and the gable tops thereabove, with side sections that extend the full length of each end bay or substantially the full length of each side of the greenhouse. An object of the invention is the provision of means for effecting the light-proof sealing of the area within such greenhouse by such curtains, and for effecting the simultaneous drawing of such curtains to admit daylight to within the greenhouse.

Other objects and advantages will appear in the description and in the drawings.

In the drawings.

FIG. 1 is a reduced size, greatly simplified, semi-schematic view of a row of adjoining greenhouses, or separately gabled sections of a greenhouse, with the top, side, and end curtains indicated in closed position;

FIG. 2 is an enlarged, simplified view of the left end greenhouse 1 of FIG. 1 showing the top side and one end curtain in closed position;

FIG. 3 is a view similar to that of FIG. 2 but with the top curtain, side and end curtains in substantially open position;

FIG. 4 is an enlarged side-elevational view of one of the curtain supports for the top curtain;

FIG. 5 shows a plurality of the supports of FIG. 4 when the top curtain is collapsed, one of said supports being shown in cross section and the others in elevation;

FIG. 6 is an end view of one of the curtain supports of FIG. 4 as seen from the right-hand side of the support of FIG. 5, and which support is illustrated at the juncture between the top curtain and one of the side curtains;

FIG. 7 is a semi-schematic view showing the reeving for the draw cords controlling the simultaneous opening and closing of the top, side and end curtains, when the top and side curtains are in closed position;

FIG. 8 is a view similar to that of FIG. 7 but with the top and side curtains in open position;

FIG. 9 is a schematic view of the reeving of the draw cords for a greenhouse;

FIG. 10 is a fragmentary, part-sectional view showing the means for simultaneously drawing and opening the curtains;

FIG. 11 is a fragmentary cross-sectional view at the juncture between a pair of adjoining greenhouses having a common open side communicating between them;

FIG. 12 is a fragmentary part-sectional view of a curtain supporting means at one of the ends of the building shown in FIG. 1;

FIG. 13 is an enlarged elevational view of structure similar to that in the upper left-hand portion of FIG. 12, except with the curtains in an opened position;

FIG. 14 is a top plan view, partially in section, taken generally along line 14—14 of FIG. 11; and, FIG. 15 is a block diagram of control means.

In FIG. 1, a plurality of bays 1 in a row in side-by-side adjoining relation is shown. The number of bays may vary in number from a pair only up to whatever number may be desired.

Each bay has a gable top 2, FIGS. 1–3, and a row of roof-suporting posts 3 are below and extend longitudinally of each valley 4 formed by adjacent pairs of the gables 2 and posts 3 are also along each opposite side of the greenhouse, or the outermost side of each end bay. Suitable girders may be positioned across the tops of the rows of posts. This building structure is common in greenhouses, it being understood that the roofs, sides and ends of the house are of glass or light transmitting material, and the light admitting and excluding curtains are within the building. Any fixed portions of the greenhouse other than the glass may be called the frame and designated 5.

In the arrangement shown in FIG. 1, each bay 1 has a separate top curtain 6 adapted to extend thereover and a continuation 7 of each top curtain 6 depends at the ends of each bay to provide end curtains 7 (FIGS. 2, 3). Each top curtain 6 over each end-bay 1 has a continuation that depends therefrom along each side of the building to provide side curtains 8 that extend the full length of the end bays.

Curtain opening and closing means is provided within the greenhouse, as will be later described, for simultaneously drawing the top and end curtains of each bay from a light sealing, or closed position relative to each other to a light admitting or open position, and at the same time to elevate the side curtains from closed or depending light-excluding positions, to open or light admitting position.

When the curtains are closed, the interior of the greenhouse is in total darkness and when the curtains are opened, the curtains are collapsed, generally accordion fashion, to admit substantially the maximum amount of light. Improved means is provided to insure against the admission of light, it being understood that the curtains themselves are of flexible material that does not transmit light therethrough.

The supporting means for the top curtains 6 comprises parallel, horizontally extending cables 9 in spaced side-by-side relation above the plant growing area in each bay. These cables are anchored at their ends at points on frame 5 along the opposite sidewalls of the greenhouse adjacent to the place where the side curtains 8 and the top curtains 6 of the end bays are positioned.

Above each cable 9 is a horizontally elongated endless cord or rope 10, preferably of nylon. Each rope 10 extends at its opposite ends over pulleys 13, which pulleys, in turn, are anchored on frame 5 above the ends of each cable 9.

The endless ropes 10 each provide upper and lower horizontally extending runs 14, 15. Disposed between the upper and lower runs 14, 15 of each rope 10, and spaced between the pair of pulleys 13 of each endless rope 10, is an endless, horizontally extending sprocket chain 16, each chain having upper and lower horizontally extending runs 17, 18.

Each endless chain 16 extends at its ends over sprocket wheels, 19, which sprocket wheels, in turn, are secured on parallel shafts 20 disposed in side-by-side horizontally spaced position approximately at two opposite sides of one of the bays, it being understood that the lower run 18 of each chain extends the full width of the bay therebelow, and the bearings supporting shafts 20 may be carried by the rows of posts 3 along opposite sides of such bay, or on brackets or any suitable frame member carried by said posts.

Positioned between shafts 20 is another shaft 23, which shaft is connected with one of the shafts 20 by endless sprocket chains 24 extending over sprocket wheels 25 that are respectively secured on said shaft 23 and said one of shafts 20. This shaft 23 is about midway between the shafts 20 and the upper run 17 of each chain 16 extends over and is supported on said shaft 23. The upper and lower runs of chain 16 may be quite long, and in the absence of shaft 23, they may lock together if the upper run 17 is allowed to droop without a support. Inasmuch as shaft 23 is rotated, under power, in the same direction as shafts 20, and at substantially the same surface speed as the linear speed of the upper run 17, there is no material wear on the shaft 23 or the chain. By supporting the upper run 17 of the chain on the shaft 23 instead of on a wheel, there is no danger of said upper run bouncing off a wheel, as would under certain circumstances, otherwise occur. A chain and sprocket connection between shaft 23 and shaft 20 may be positioned between each adjacent pair of chains 16.

The top curtains 6 are supported for movement transversely thereof, by a plurality of substantially equally spaced hangers generally designated 27 (FIGS. 4-6). Each of these hanger means comprises a peripherally grooved roller 28, preferably of nylon or similar material, carried on each cable 9 for rolling on the latter. Cable 9 is within the groove 29 of each roller. A substantially U-shaped hanger 30 is suspended from the opposite end portions of a central shaft 33 on which each roller is supported for rotation. The opposite legs 34 of the U-shaped hanger 30 are formed with horizontally aligned side opening, vertically elongated recesses 35 (FIGS. 4, 5) and the opposite end portions of each shaft 33 are grooved to receive the edges of said recesses 35. The side openings are designated 36.

To secure the shaft 33 of each roller to a hanger, the ends of each shaft are laterally passed into recesses 35 through the side openings 36 at the grooves on the ends of the latter. The recesses 35 extend below the side openings 36 in the legs 34 of each hanger 30, and the opposite sides of each of the recesses 35 at the side openings 36 may be slightly restricted so that the bottoms of the grooves in the ends of each shaft 33 must spring at least one of the opposite edges of recess 35 apart to be seated in the bottom of each recess. By this structure the rollers will not become accidentally dislodged from side members or legs 34 of the hangers.

The grooves in the ends of each shaft 33 will space the legs 34 of each hanger from the sides of the roller therebetween, to prevent binding of the roller or wear thereon.

The lower closed end portion 38 of each U-shaped hanger 30 is formed with a lateral extension 39 (FIGS. 4, 5) generally parallel with cable 9 that supports the hangers, and these extensions extend to the same sides of the hangers (FIG. 5) so that the rollers may move to positions relatively close to each other in uniform position. The outer end of each extension is provided with an upstanding end piece 40 that is formed with laterally projecting end wing portions 43 that project oppositely upwardly from extension 39. Each end piece 40 is preferably horizontally arcuately formed so that its convex side faces the space between the lower ends of side members 34 of the hanger 30 that carries the roller.

The top curtains 6 are suspended from hangers 30 by pairs of cords 44 or the like (FIGS. 4, 6) in which the pairs of cords are sewed or otherwise suitably secured at their ends to the top curtain at points 45 (FIGS. 4, 6) spaced from each other and spaced at opposite sides of a vertical plane in which the length of cable 9 is positioned. The portions of cords 44 of each pair, intermediate their ends extend between the lower portions of legs 34 of each hanger, and to opposite sides of each extension 39 on each hanger, and below the projections 43 on each extension 39.

By the above structure the top curtain is loosely supported at a plurality of points adjacent to and below each hanger. To replace a roller or hanger, it is merely necessary to spring the ends of the roller shaft 33 downwardly past the restricted lower sides of each recess 35 at the upper level of the side openings 36 and then move the ends of each shaft 33 through said side openings, after which the cords 44 may be lifted out of the open upper end of the U-shaped hanger, and the hanger may be replaced or a new roller may be substituted without removal of the cords 44 from the curtain.

The connection between the cords and the curtain are light proof.

The lower run 18 of each chain 16 is connected by a link 47 with the lower run 15 of rope 10 (FIG. 11).

Intermediate the posts 3 of the rows thereof that are along the opposite sides of the greenhouse, inverted V-shaped strips 50 that extend longitudinally of each row, and one side 53 of each strip 50 projects laterally outwardly of one side of the row of posts carrying a strip 50 while the other side 54 of the strip 50 projects to the opposite side of the row of posts (FIG. 11). These strips 50 are below the level of the cables 9 that support the top curtains 6.

In FIGS. 1, 7 and 11, 12 the top, side and end curtains are indicated in closed position, and the structure in these is one in which the top and end curtains were moved to said closed position to the right, as seen in the views. To open the top and end curtains they must be moved to the left.

Each top curtain 6 in the above arrangement includes a marginal portion 56 along the right-hand edge of each curtain, and an end hanger 57 of the plurality supporting each curtain from cable 9 is positioned substantially at the juncture between marginal portion 56 and the remainder of each curtain. Each end hanger 57 is connected by a cord 58 or any other suitable means with the lower run 15 of rope 10. The marginal portion 56 is weighted along the free edge thereof by a bar 59. When each curtain 6 is drawn to the right to said closed position (FIG. 11) the depending marginal portion of each top curtain will engage the edge of the side 53 of strip 50 and will be yieldably held in light sealing relation therewith by the weight of each bar 59.

A similar light sealing relation is between the right-hand top curtain 6 and a single downwardly extending strip 60 that is carried by the posts 3 along the right side of the greenhouse (FIG. 12).

The portion of each top curtain 6 along the edge opposite to each depending marginal portion 56 may be secured in tight, light-proof manner to the side 54 of each strip 50, except for the left-hand top curtain as seen in FIG. 12, and the side curtain 8 at the left side of the building may be a continuation of said left-hand top curtain. Any suitable links or connectors 63 may substantially stationarily connect the left side curtain 8 and the top curtain 6 to the frame 5 of the greenhouse at the juncture between said left-hand top curtain and the side curtain 8.

The left-hand side curtain 8, as seen in FIG. 12, is secured at its upper end in light sealing relation to strip 6 at 64.

A horizontal rod 65 is carried by each side curtain along its lower edge, and a depending marginal portion 66 of each side curtain may, if desired, depend below each rod 65 for making sealing engagement with the inclined surfaces of base strips 67 extending along the floor of the greenhouse along each sidewall.

Draw cords 71 are connected at one of their ends with the upper run 14 of rope 10 and at their other ends with the rod 65 or the lower portion of the left-hand side curtain 8, as viewed in FIG. 12. These cords extend down the outer side of said side curtain through loops 72. The cords also extend over roller 73 that are carried by the frame of the building adjacent to and above the upper end of the left-hand side curtain 8, and the point at which each cord connects with the said upper run 14 of each rope 10 is adjacent to the left-hand pulleys 13.

At the right-hand side of the building, as viewed in FIG. 12, a draw cord 74 connects at one end with the weight rod 65 on the right-hand side curtain 8 and extends upwardly across the outer side of said curtain through loops 75 on said curtain and over a roller 76 for connection with the lower run 15 of rope 10 adjacent to the right-hand pulley 13.

From the foregoing, it will be apparent that upon actuating the chains 16 to move their lower runs 18 to the left, the lower run 15 of rope will also be moved to the left and will collapse the top curtain 6, and at the same time the side curtain 8 will be raised and the end curtains 7 will be collapsed.

Upon actuation of the endless chain 16 to move the lower run 18 to the right, after the curtains have been collapsed, the side curtains 8 will be lowered and the top curtains 6 and end curtains 7 will be moved to closed positions.

Vertical strips or wall sections 77 may function to engage the end curtains at the ends of the rows of intermediate posts 3 to form light tight seals with the curtains, the end of each end curtain that is at the fixedly held edge of each top curtain 6 being fixed to the vertical sealing strip (FIGS. 11, 14).

As seen in FIGS. 11 and 14, light may be completely excluded at the ends of rows of posts 3 by providing an overlapping relation between side curtains 7 and a vertically disposed strip 77 inwardly of said curtain. The strip 77 may be connected to or positioned near the endmost posts 3 in each row thereof with portions extending to each side of said posts similar to the portions of light excluding strip 50.

The stationary edge of a curtain 7 in a given bay may be secured to one side of strip 77 just as the corresponding edge of curtain 6 is secured to strip 50 in light-tight relation.

The moving edge of curtain 7 in each bay may have secured to it a vertically disposed weight rod 79, which rod and the marginal edge of the moving end of curtain 7 are adapted to be received within a notch 78 cut into strip 50. The said marginal edge will thereby overlap strip 77 somewhat, minimizing the light which may enter a greenhouse along the sides darkened by curtains 7.

Referring to FIGS. 7–10, either of shafts 20 may be a driven shaft which actuates the chains 16 to open and close all of curtains 6, 7 and 8 together. A reversible motor 81 may be connected to one of shafts 20 through sprocket wheels 83, 84, chain 82 and a gear box 85.

It should be understood that the curtains in every bay are connected to rope 10 in the same manner as the single illustrations of FIGS. 7, 8 and 11 (see FIG. 12) and that when rope 10 is actuated to open or close the curtains of the bay nearest the driving arrangement, the curtains in all other bays will be operated accordingly.

Motor 81 can be actuated to initiate an opening or closing operation manually or it can be actuated by any common timing device.

Likewise, when the curtains have completed an opening or closing operation, motor 81 can be stopped manually, or it can be stopped by a limit switch such as 90 (FIG. 10) which is actuated by a moving feeler 91 which moves with the opening or closing curtain. Similar limit switches 92 could be located at the extreme open position of the curtain 6, so that motor 81 could then be turned off at the end of either curtain opening or closing operations automatically.

It has also been found desirable to place a number of such switches 90 throughout the plurality of bays in a greenhouse system in order to assure that all portions of curtains 6, 7 and 8 are either completely closed or completely opened before motor 81 is stopped.

FIG. 15 is a simplified block diagram illustrating one of various systems capable of being wired by one skilled in the art for the operation of motor 81. A three-phase source of current may be fed through an automatic timing device 95 or through a manual control box 96. For forward operation, current would be handled through the "F" phase of either 95 or 96 and then pass through normally closed switch 90, or any desired number of such switches, to motor 81 for drawing curtain 6 closed. When feeler or feelers 91, moving with the leading edge of curtain 6, engages and opens switch 90 or the plurality thereof, the source of current to motor 81 is cut off and the motor is stopped when curtain 6 is in a fully closed position.

In a curtain opening operation, the flow of current to reversible motor 81 is cut off and the motor stopped when feeler 91, or the plurality thereof, engages and opens its respective switch 92 thus terminating a curtain opening operation.

It is to be understood that the above detailed description discloses the preferred form of the present invention but it is not intended to be limiting, as other forms and modifications may occur to those skilled in the art which do not depart from the spirit of this invention and which come within the scope of the appended claims.

We claim:
1. In a greenhouse having a plant growing area above a floor, said area being divided into a plurality of adjoining bays of substantially uniform width open on their adjoining sides, separate roofs over said bays connected along lines of division between said bays, a pair of spaced opposed vertically disposed outer end walls extending across the ends of said bays and a pair of spaced opposed vertically disposed outer side walls defining the oppositely outwardly positioned sides of said plurality of bays; said roofs, outer end walls and outer side walls being of light-transmitting material, and a frame supporting them in cooperative relation to said floor for surrounding said area;

(a) daylight excluding means comprising inner roof walls of opaque, flexible sheet material supported within said greenhouse over each of said bays, a pair of inner end walls extending over the ends of said bays, and a pair of inner side walls along said outer side walls extending across the oppositely outwardly facing sides of said plurality of bays, (b) supporting means on said frame supporting said inner roof walls, inner end walls and inner side walls, depending from said supporting means, in extended positions obstructing the passage of daylight into said bays and for movement from said extended positions to collapsed positions exposing said bays to daylight, (c) roof and wall moving means connected with each of said inner roof walls, said inner end walls and said inner side walls for simultaneously moving each of said inner roof walls, and each of said end walls and said side walls from said extended positions to said collapsed positions and vice versa.

2. In a greenhouse as defined in claim 1;

(d) said supporting means including elongated, parallel horizontally disposed elements in side-by-side relation extending transversely of said bays over said inner roof walls substantially from one of said outer side walls to the other and supported by said frame, and hangers on said elements movable longitudinally of the latter connected with said inner roof walls for suspending the latter from said elements, (e) said roof and wall moving means including a pair of horizontally extending, parallel rope supporting shafts supported on said frame for rotation in positions respectively adjacent to and above said inner side walls and extending substantially from end-to-end of said inner side walls; a pair of wheels on each of said shafts and a pair of horizontally extending endless ropes or the like in spaced, parallel, side-by-side relation extending at their ends over the wheels on said shafts providing upper and lower pairs of parallel runs extending over and normal to the lengths of the bays and inner roof walls therebelow, and (f) connectors connecting said lower runs of said ropes with each of said inner roof walls adjacent to one of the corresponding longitudinally extending edges of said inner roof walls when the latter are in extended positions whereby said inner roof walls will be simultaneously moved to said collapsed position when said ropes are actuated for movement of said lower runs in one direction, and single power means operatively connected with said ropes for so actuating them.

3. In a greenhouse as defined in claim 2;

(g) said inner end walls being integrally connected with the inner roof walls respectively adjacent thereto, and (h) ropes connecting the lower portion of one of said inner side walls with said lower runs of said endless ropes for brailing said one of said inner side walls from extended position to collapsed position adjacent to the upper side of the bay adjacent thereto when said ropes are actuated for movement of said lower runs in said one direction for moving said inner roof walls to collapsed positions, and (i) ropes connecting the lower portion of the other of said inner side walls with the upper runs of said endless ropes for brailing said other of said inner side walls from extended to collapsed position adjacent to the upper side of the bay adjacent thereto when said ropes are actuated to move said inner roof walls to said collapsed positions.

4. In a greenhouse as defined in claim 2;

(g) means for connecting said power means with said ropes for actuating the latter comprising a pair of parallel, horizontally extending, endless sprocket chains in side-by-side relation and parallel with said pair of endless ropes providing upper and lower horizontally extending runs of said chains, and (h) a pair of spaced chain supporting shafts parallel with said rope supporting shafts and sprocket wheels on said chain supporting shafts over which sprocket wheels the ends of said pair of chain extend, said chain supporting shafts being spaced apart substantially the width of each bay, and (i) means connecting one of the runs of each chain adjacent to the sprocket wheels on one of said chain supporting shafts with one of said endless ropes for moving said lower and upper runs of said ropes a distance approximately equal to the width of a bay upon movement of said last-mentioned means from the sprocket wheels on one chain supporting shaft to substantially the sprocket wheels on the other chain supporting shaft.

5. In a greenhouse as defined in claim 4;

(j) an intermediate shaft parallel with and intermediate said pair of chain supporting shafts supported on said frame for rotation and in a position between the upper and lower runs of said pair of sprocket chains, (k) said power means being a motor having a driving connection with one of said chain supporting shafts, a pair of driving sprocket wheels respectively secured on said one of said chain supporting shafts and said intermediate shaft and an endless driving sprocket chain extending over the driving sprocket wheels of said pair, (l) said upper runs of said pair of sprocket chains being supported intermediate their ends on said intermediate shaft, whereby upon actuation of said motor for driving said one of said shafts in one direction or the other, said intermediate shaft will also be driven in a corresponding direction and in the same direction as movement of said driving chain and will support said upper and lower runs of said driving chain spaced apart.

6. In a greenhouse as defined in claim 2;

(g) means for connecting said power means with said ropes comprising a horizontally extending endless sprocket chain providing upper and lower horizontally extending runs parallel with said ropes, and a pair of chain supporting shafts rotatably supported on said frame having a pair of sprocket wheels respectively secured thereon over which the ends of said chains extend, (h) the spacing between said sprocket wheels being approximately equal to the width of one of said bays, and means connecting said rope with said lower run of said chain adjacent to one sprocket wheel of said pair when said inner roof walls are expanded whereby said inner roof walls will be simultaneously moved to said collapsed positions upon actuation of one of said sprocket wheels for moving said last-mentioned means to the other sprocket wheel, (i) said power means being connected with said one of said chain supporting shafts for actuating said sprocket wheels to move said sprocket chain and the means connecting it with said rope.

7. In a greenhouse as defined in claim 1;

(d) said roof and wall moving means including a single electrical motor in an electrical circuit, operatively connected with said inner roof walls and with said inner end walls and said inner side walls for effecting therein said simultaneous movement upon said circuit being closed, and (e) a plurality of limit switches for opening said circuit upon said inner walls being moved to complete light obstructing extended positions, and (f) means connected with said inner walls for movement therewith and into engagement with said limit switches for actuating said switches to open said circuit and to discontinue movement of said inner walls upon said movement of said walls fully to said light obstructing extended positions, and (g) timing means for automatically closing said circuit for actuating said motor for moving said inner walls at predetermined time intervals.

References Cited

UNITED STATES PATENTS

| | | | |
|---|---|---|---|
| 468,536 | 2/1892 | Pickens | 47—28 |
| 2,193,921 | 3/1940 | Gibbons | 47—17 |
| 2,440,557 | 4/1948 | Power | 135—1 |
| 3,294,150 | 12/1966 | Thomas | 160—5 |
| 3,315,727 | 4/1967 | Clark | 160—84 |
| 3,418,752 | 12/1968 | Stratton | 47—28 |

FOREIGN PATENTS

| | | |
|---|---|---|
| 1,113,577 | 5/1968 | Great Britain. |
| 173,559 | 7/1906 | Germany. |
| 565,280 | 11/1932 | Germany. |

ROBERT E. BAGWILL, Primary Examiner

U.S. Cl. X.R.

135—1; 160—2, 84; 47—28